United States Patent [19]

Mateus

[11] Patent Number: 4,531,692
[45] Date of Patent: Jul. 30, 1985

[54] HELICOPTER FLIGHT CONTROL AND TRANSMISSION SYSTEM

[76] Inventor: Ernesto Mateus, P.O. Box 5149, Quito, Ecuador

[21] Appl. No.: 358,014

[22] Filed: Mar. 15, 1982

[51] Int. Cl.³ .................... B64C 27/82; B64C 27/10
[52] U.S. Cl. .......................... 244/17.19; 244/17.23
[58] Field of Search ............ 244/17.19, 17.23, 17.21, 244/91, 17.11, 6, 7 R; 416/128, 129

[56] References Cited

U.S. PATENT DOCUMENTS

| | | | |
|---|---|---|---|
| 1,052,334 | 2/1913 | Gettys et al. | 244/91 |
| 1,179,298 | 4/1916 | Garretson | 244/17.19 |
| 1,180,271 | 4/1916 | Tarbox | 244/91 |
| 1,635,897 | 7/1927 | Nelson | 244/17.19 |
| 2,216,013 | 9/1940 | Kenney . | |
| 2,318,260 | 5/1943 | Sikorsky | 244/17.21 |
| 2,394,846 | 2/1946 | Cox . | |
| 2,401,694 | 6/1946 | Lundquist . | |
| 2,408,275 | 9/1946 | Shaeffer . | |
| 2,487,020 | 11/1949 | Gilcrease . | |
| 2,667,227 | 1/1954 | Laskowitz . | |
| 2,698,147 | 12/1954 | Hovgard | 244/7 R |
| 2,792,189 | 5/1957 | Altemus | 244/7 R |
| 2,829,721 | 4/1958 | Gebhard . | |
| 3,029,048 | 4/1962 | Brooks et al. | 244/17.19 |
| 3,126,966 | 3/1964 | Agamian . | |
| 3,138,349 | 6/1964 | Piasecki | 244/17.21 |
| 3,327,969 | 6/1967 | Head | 244/7 R |
| 3,450,208 | 6/1969 | Barton | 416/129 |
| 3,669,564 | 6/1972 | Garfinkle . | |
| 3,735,945 | 5/1973 | Huvers . | |

FOREIGN PATENT DOCUMENTS

| | | | |
|---|---|---|---|
| 1136580 | 9/1962 | Fed. Rep. of Germany | 244/17.21 |
| 1144116 | 2/1963 | Fed. Rep. of Germany | 244/17.21 |
| 606420 | 8/1948 | United Kingdom | 244/17.19 |

Primary Examiner—Trygve M. Blix
Assistant Examiner—Rodney Corl
Attorney, Agent, or Firm—Pravel, Gambrell, Hewitt & Kimball

[57] ABSTRACT

A helicopter flight control system which eliminates the need for a cyclic pitch control and a power transmission which automatically balances the reactive torque forces imparted by counter-rotating lift rotors is disclosed.

12 Claims, 9 Drawing Figures

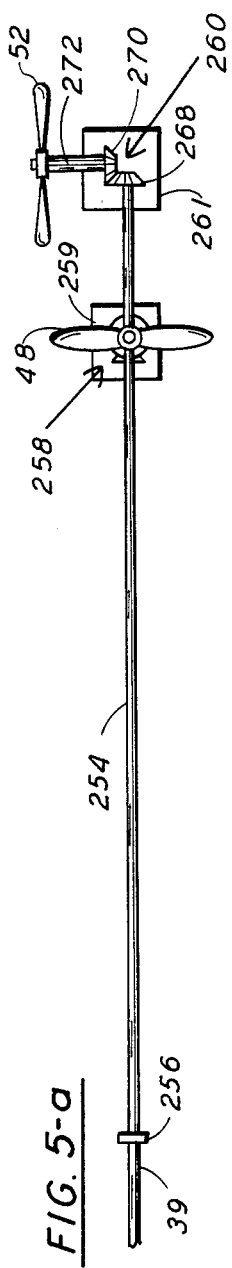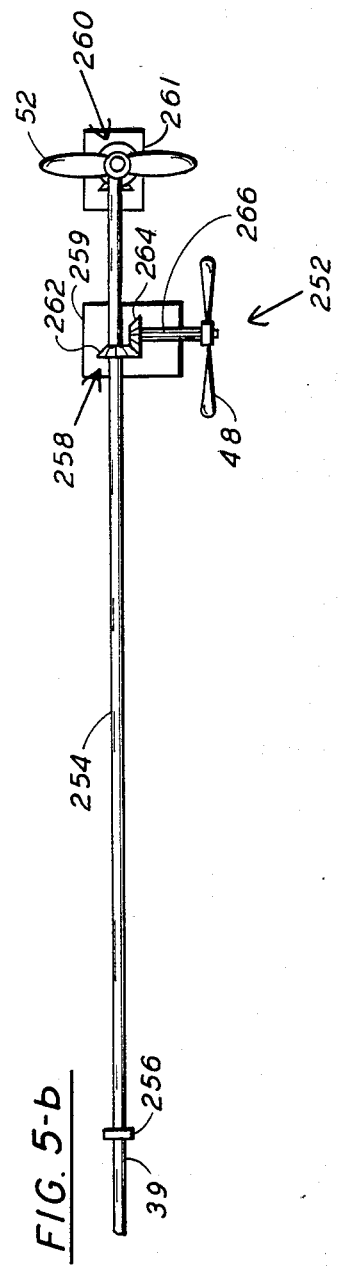
FIG. 5-a
FIG. 5-b

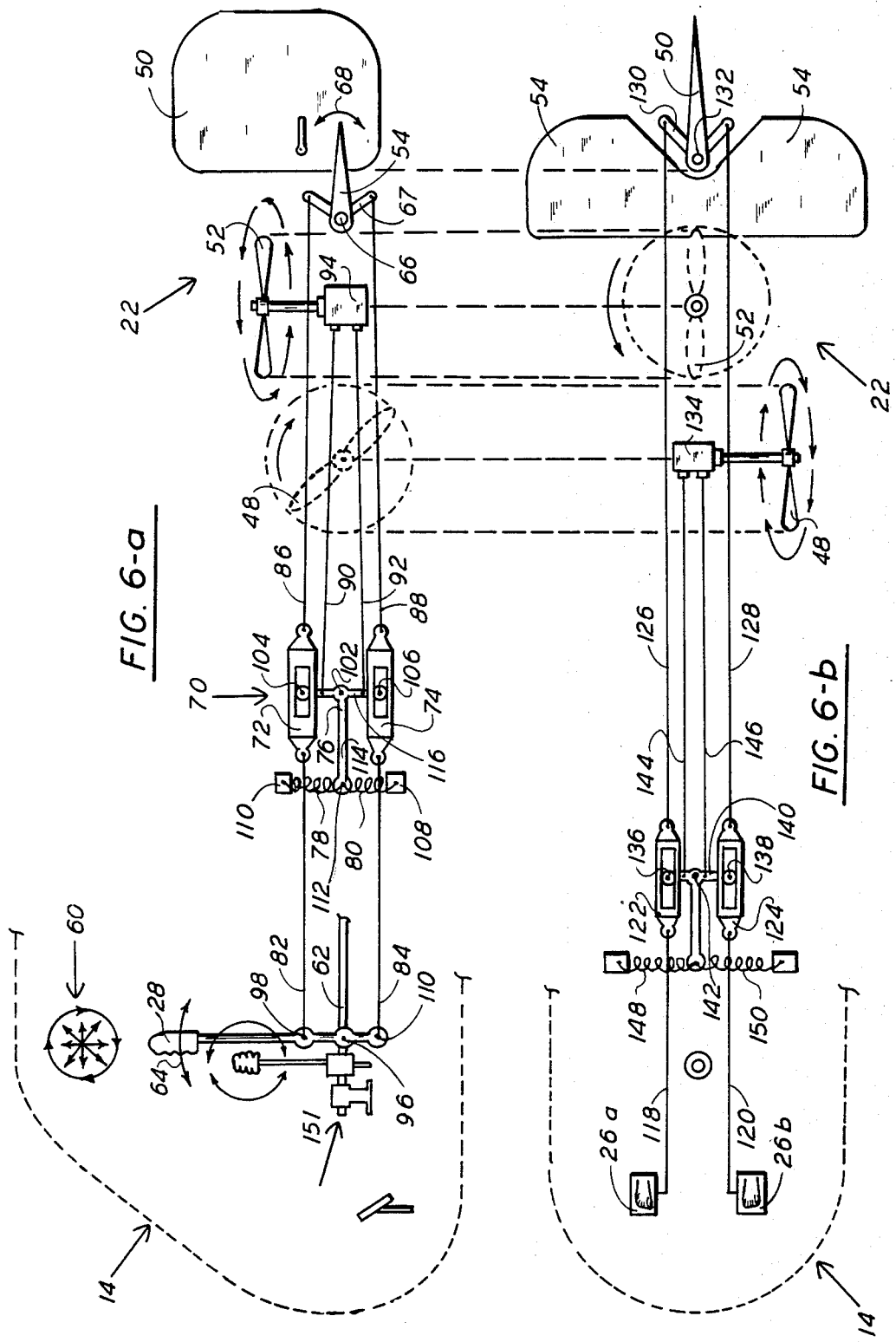

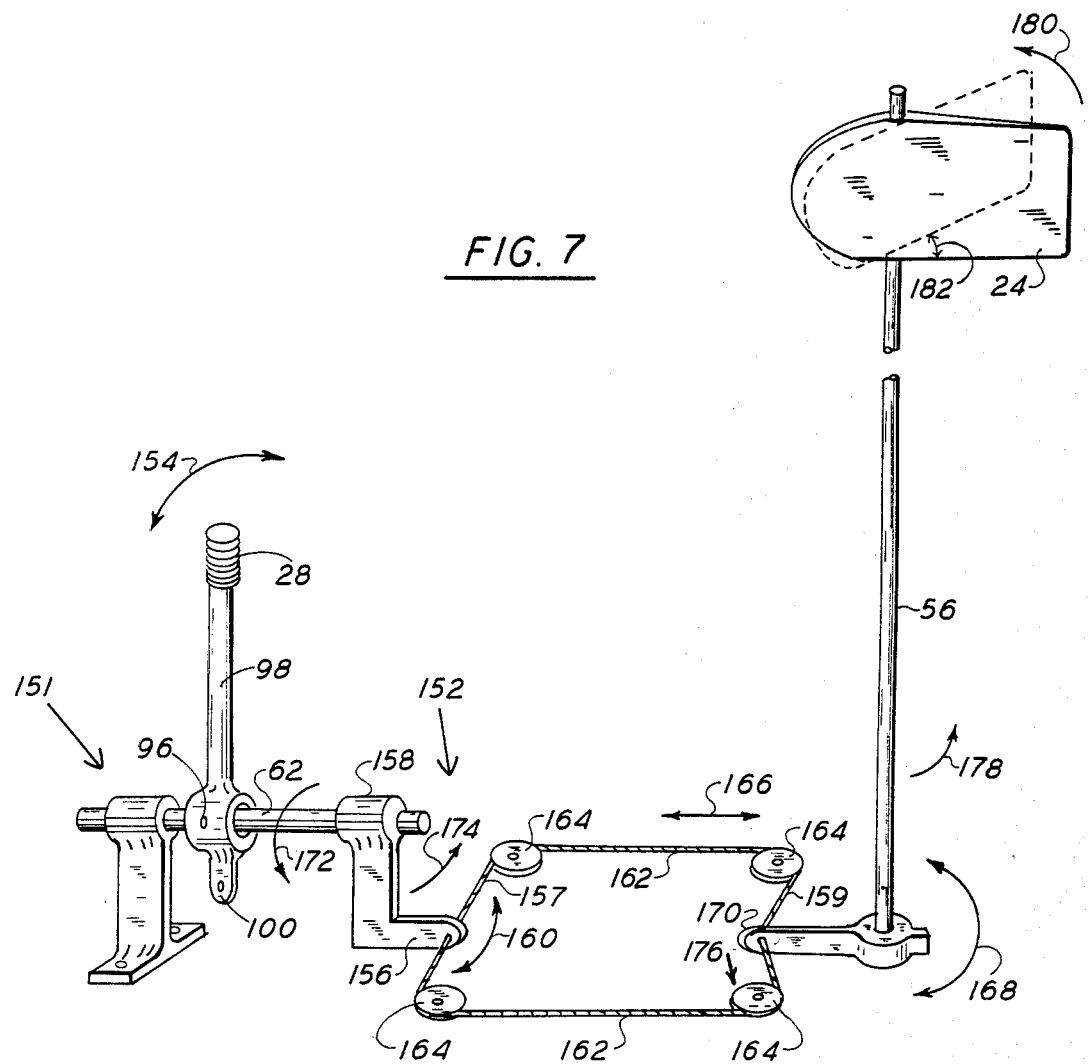

HELICOPTER FLIGHT CONTROL AND TRANSMISSION SYSTEM

SPECIFICATION

1. Field of the Invention

The present invention relates to helicopters, and more particularly to helicopter transmission and flight attitude control systems.

2. Description of the Prior Art

Various helicopter flight control and transmission systems are known in the art. Conventional helicopter flight controls typically employ a single lift rotor, a cyclic pitch control and a tail rotor to counter-balance torque forces exerted by the lift rotor which together provide pitch, roll and yaw control.

In the past, the direction of flight of the helicopter was controlled by a cycling pitch control which selectively increased the pitch of the rotor blades at one point in each rotation to produce an imbalance in lift at that point, thereby tilting portions of the helicopter and providing a horizontal force vector in the desired direction of flight. Such control systems not only require a great deal of pilot flight training but also are expensive to manufacture and maintain. Prior systems which sought to eliminate the need for cyclic pitch control have proven unreliable, mechanically complex, expensive and difficult to maintain.

Various transmission systems to drive the principal lift rotors of helicopters equipped with single or dual, counter-rotating blades are known. It is also known that the use of counter rotating coaxial rotors has the effect of balancing the torque forces applied to a helicopter chasis under ideal conditions. Therefore one of the principle motives for developing transmission systems to drive dual counter-rotating rotors is to achieve a balanced torque couple, thereby eliminating the need for a vertical tail rotor to stabilize the aircraft. In some such systems the speed of the individual lift rotors could be selectively varied to provide an imbalance in torque forces to control the yaw of the aircraft. Such systems typically involved complex hydraulic braking mechanisms or devices for varying the aerodynamic drag on one or more of the rotor blades.

In short, helicopter flight control systems in the past have been mechanically complex and difficult for a pilot to manage.

SUMMARY OF THE INVENTION

Briefly, the present invention provides a new and improved helicopter flight attitude control and transmission system which does not require a cyclic pitch control for the lift rotors and which provides flight controls similar to those used in simple fixed wing aircraft. The system of the present invention includes a pair of counter-rotating lift rotors with collective pitch control which are driven by a single prime mover such as an internal combustion or turbine-type engine through a unique transmission which automatically maintains a balance in reactive torque forces applied to the aircraft. The flight attitude control system includes a vertically oriented, variable pitch tail rotor for controlling the yaw of the helicopter, a horizontally oriented variable pitch tail rotor for controlling the pitch of the helicopter, a vertical tail rudder, a horizontal, tail-mounted elevator, and a vertically oriented control surface or airfoil mounted directly above the lift rotors on a shaft concentric with the rotor drive shafts to selectively roll the helicopter (i.e. rotation about the longitudinal axis of the helicopter fuselage).

The vertical and horizontal tail rotors are employed to provide supplementary control forces when the helicopter is hovering, moving too slow or in situations where a high degree of maneuverability is required so that the aerodynamic forces on the tail, vertical rudder and vertical control surface are insufficient to provide adequate control. The overall effect of the control system of the present invention is to provide a simple, inexpensive, safe, and easily maintained flight control and transmission system which operates in much the same manner as simple fixed wing aircraft systems.

The transmission of the present invention employs a single prime mover to engage a unique dual differential gear system arranged so that changes in the load encountered by one of the rotating blades (producing a corresponding change in rotor speed and reactive torque) is automatically balanced by a change in the speed of rotation of the other blade to maintain a balance in the reactive torque as well as the total lift provided by the pair of rotors.

BRIEF DESCRIPTION OF THE DRAWINGS

FIGS. 5a–b are schematic drawings of a transmission rod and gear box arrangement for the vertical and horizontal tail rotors forming a part of the present invention;

FIGS. 6a–b are schematic drawings of a control assemblies for the vertical and horizontal tail rotors, rudder and horizontal stabilizer which form a part of the present invention.

FIG. 7 is a schematic drawing of the control assembly for the vertical control surface forming a part of the present invention;

DESCRIPTION OF THE PREFERRED EMBODIMENT

Figure 1:
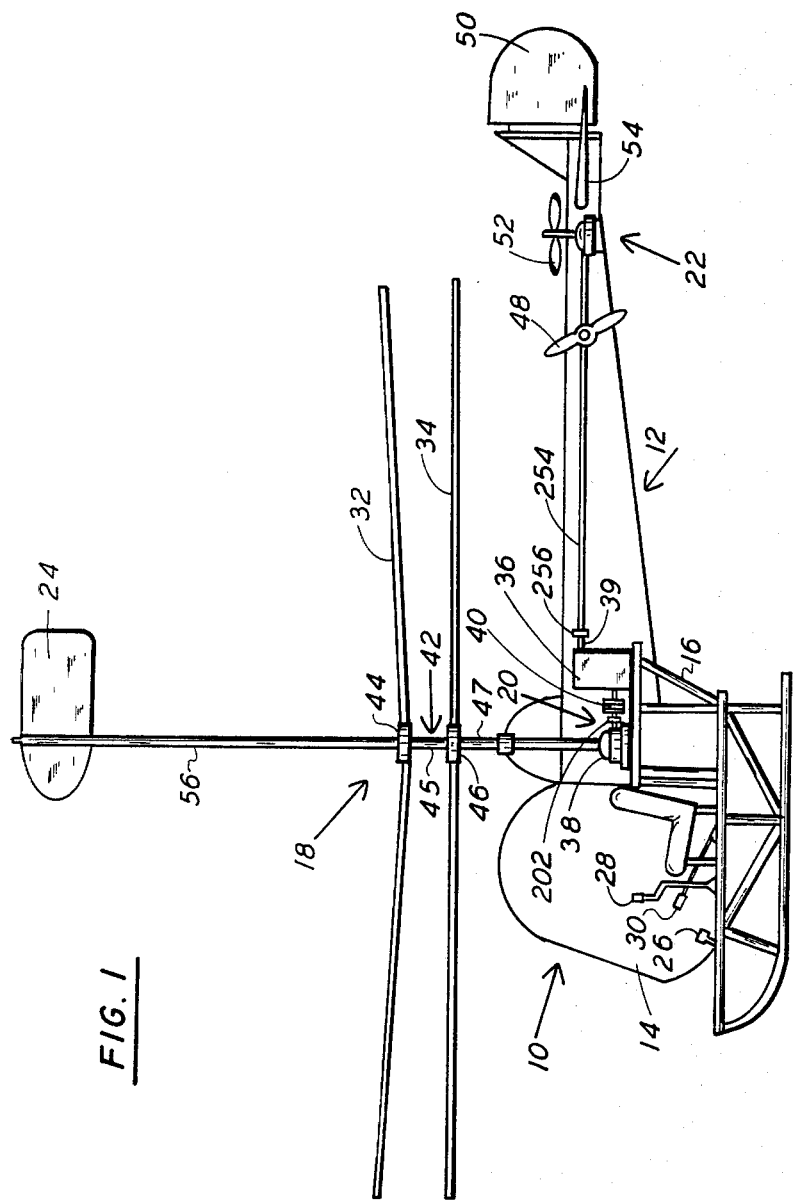
FIG. 1 is an elevational view of a helicopter equipped with a control system in accordance with the present invention.

In the drawings, a helicopter 10 equipped with a transmission and control system of the present invention, includes a fuselage 12, a passenger compartment 14, a frame 16, a rotor assembly 18, engine-transmission assembly 20, a control assembly 22, and a vertical control surface or airfoil 24 (FIG. 1).

Enclosed in passenger compartment 14, and positioned for operation by the pilot are pedal rudder controls 26 which may be operated similarly to rudder control pedals on conventional fixed-wing aircraft, a stick control 28 which may be operated in a 360° range of motion to control the pitch of the helicopter in the same manner as the stick in fixed wing aircraft, and collective rotor pitch control 30 to collectively vary the pitch of lift rotors 32 and 34, thereby controlling the amount of lift generated by rotor assembly 18.

Engine-transmission assembly 20 is securely mounted to frame 16, and includes an engine 36, which supplies power to a transmission 38, through a clutch 40. Engine 36 and clutch 40 may be any engine-clutch assembly as are known in the art suitable for driving rotor assembly 18 through transmission 38. A clutch 40 is adapted to allow engine 36 to be selectively engaged or disengaged to transmission 38 by suitably located pilot controls.

Rotor assembly 18 includes counter-rotating rotors 32 and 34 mounted to shaft assembly 42 by rotor shaft couples 44 and 46 respectively. Shaft couples 44 and 46 are illustrated schematically and may be any suitable couple which allow rotors 32 and 34 to be driven by drive shafts 45 and 47 (FIG. 1), respectively, and allow for theprovision of collective pitch control such as a conventional swash plate and control rod assembly.

Control assembly 22 includes a vertical tail rotor 48 with a selectively variable pitch and a vertical rudder 50 which, in combination with control surface 24, control the yaw of helicopter 10 and are operated by rudder pedal controls 26. Control assembly 22 also includes a horizontal, variable pitch, tail rotor 52 and a horizontal stabilizer 54 which in combination control the pitch of the helicopter in response to activation of stick control 28.

Vertical airfoil 24 is securely mounted to shaft 56 which is contained concentrically within rotor shaft assembly 42. Airfoil 24 may be selectively rotated about the axis of shaft 56 in response to operation of stick control 28 to roll helicopter 10 (i.e. to cause the helicopter to bank to one side or the other) in response to aerodynamic forces on surface 24 which are transmitted through shaft 56 to helicopter 10.

In operation, as will be described in detail, a pilot controls the direction of flight of helicopter 10 as follows:

(a) vertical lift is controlled by operating collective pitch control 30 which, when activated, varies the pitch of rotors 32 and 34 uniformly to either increase or decrease the total vertical lift forces provided by rotors 32 and 34;

(b) longitudinal pitch is controlled by operating stick control 28 in a forward or rearward direction, corresponding to the desired direction of flight, to activate elevator 54 and horizontal rotor 52 in the manner described hereinafter to either raise or lower control assembly 22 relative to passenger compartment 14 (and the other forward portions of helicopter 10) about the center of gravity of helicopter 10;

(c) roll is controlled by operating stick control 28 in a lateral (the pilot's left or right) direction corresponding to the desired direction of flight. Operation of stick 28 in this manner activates, in the manner described hereinafter, vertical airfoil 24, which rotates about shaft 56 to induce a tilting aerodynamic force on airfoil 24. When helicopter 10 is hovering, flying slow or maneuvering radically, direction of flight may also be controlled by operating rudder pedals 26, which activate rudder 50 and rotor 48 to rotate helicopter 10 about its vertical axis. This rotation in combination with operation of stick 28 which, when operated in the extreme forward or rearward direction, activates rotor 52 to lift or lower the tail portion of the helicopter fuselage 12, causes helicopter 10 to fly in the desired direction.

DETAILED DESCRIPTION OF THE CONTROL MECHANISMS

In FIGS. 6a-b the mechanisms for the operation of control assembly 22 are schematically illustrated. Note that the control mechanisms are illustrated as lying in a single plane for simplicity, whereas the mechanism illustrated would have to be adapted so as to be in more than one plane to be employed with the helicopter 10 illustrated in FIG. 1. Such an adaptation and the mechanism needed to accomodate the adaptation are known and are within the knowledge of one of ordinary skill in the art. It is understood that the materials and construction of control mechanisms should be chosen to be suitable for use in aircraft, i.e. lightweight, strong and durable materials. Control surface mechanisms for aircraft are well known in the art, and therefore details of devices for mounting the various control mechanisms to the aircraft and the selection of suitable materials as are known to one of ordinary skill in the art are not included in the following description. It is also understood that mechanisms for affecting movement of control surfaces in aircraft in response to the action of a control stick, such as stick 28 of the present invention, or rudder pedals, such as pedals 26 of the present invention are also within the knowledge of one of ordinary skill in the art and the following description is only schematically illustrative of one mechanism which may be employed to operate the combined control system of the present invention.

In FIG. 6a, control stick 28 is pivotally mounted to vertical airfoil drive shaft 62 so as to have a 360° pattern of action as illustrated by arrows 60. Operation of stick 28 in the forward or rearward direction (as illustrated by arrows 64) activates elevator 54 which is mounted to fuselage 12 via a hinge 66 so as to be free to rotate about hinge 66 in the manner illustrated by arrows 68.

Elevator 54 is operably connected to stick 28 via a control assembly 70 (FIG. 6a). Control assembly 70 includes slotted couples 72 and 74, T-lever 76, neutralizer springs 78 and 80, control lines 82, 84, 86, 88, 90 and 92, and horizontal rotor pitch control 94.

Stick 28 is mounted to control shaft 62 at pin 96 in a manner which allows stick 28 to pivot in the direction of arrows 64 about pin 96 without engaging control shaft 62. Control lines 82 and 84 are secured to stick 28 at pins 98 and 100 and connect stick 28 to slotted couples 72 and 74 respectively. Pins 98 and 100 are located equidistant from pivot pin 96 so that pivotal action of stick 28 produces equal but opposite lateral movement of couples 72 and 74. Lateral movement of couples 72 and 74 is transmitted to elevator 54 via control lines 86 and 88 respectively, and bell-crank 67 causing elevator 54 to pivot about hinge 66 in the direction of arrows 68.

Operating stick 28 in the extreme forward or rearward mode varies the pitch of horizontal rotor 52 to provide appropriate control forces to raise or lower the tail of helicopter 10 as described herein. T-lever 76 which is pivotally mounted to fuselage 12 with bearing 102, is provided with pins 104 and 106 which slidably engage slotted couples 72 and 74 respectively. T-lever 76 is maintained in a neutral position (i.e. pins 104 and 106 positioned at mid point in slotted couples 72 and 74 respectively) with respect to couples 72 and 74 by neutralizing springs 78 and 80. Springs 78 and 80 are securely mounted to helicopter 10 at spring ends 108 and 110, respectively, and are mutually connected to T-lever 76 at pin 112. Springs 78 and 80 provide force to arm 114 of lever 76 to return lever 76 to a neutral position when pins 104 and 106 are not in operative engagement with couples 72 and 74. Operation of stick 28 in the extreme forward or rearward direction causes slotted couples 72 and 74 to engage pins 104 and 106, respectively, from opposite directions thereby causing lever 76 to pivot about pin 102. The pivoting action of lever 76 causes equal but opposite tension in control lines 90 and 92 (which are connected to arm 116 of lever 76 on opposite sides of pivot point 102) which is transmitted to pitch control 94. Pitch control 94 is adapted to vary the pitch of rotor 52 in response to the tension in control lines 90 and 92, in any suitable mechanical or other conventional manner and is therefore illustrated schematically.

Thus, moderate forward or rearward operation of stick 28 activates elevator 54 only, whereas operation of stick 28 in the more extreme forward or rearward direction (as may be necessary when forward airspeed is insufficient or when performing radical maneuvers) activates both elevator 54 and horizontal rotor 52. In similar fashion as is shown in FIG. 6b, moderate operation of rudder pedals 26 activates rudder 50 and more extreme operation of pedals 26 activates both rudder 50 and variable pitch vertical rotor 48.

Rudder pedals 26 (schematically illustrated in FIG. 6b) are pivotally mounted to the floor of passenger compartment 14 to be foot-operated by the pilot in the customary manner. Pedals 26a and 26b are connected through control lines 118 and 120, slotted couples 122 and 124, and control lines 126 and 128, respectively, to bellcrank 130 which is mounted to rudder 50. Rudder 50 is pivotally mounted to fuselage 12 with bearing assembly 132, so that operation of either of rudder pedals 26 actuates rudder 50 causing it to pivot about bearing assembly 132 to one side or the other depending upon whether pedal 26a or pedal 26b is depressed by the pilot.

As more roll or azimuth control becomes necessary or desired, the pilot increases the displacement of either pedal 26a or 26b causing greater rotation of rudder 50 and eventually the actuation of variable pitch mechanism 134 of vertical rotor 48. As rudder pedal displacement is increased, the lateral displacement of couples 122 and 124 is increased correspondingly to eventually engage pins 136 and 138 of T-lever 140, causing T-lever 140 to pivot about bearing assembly 142. Rotation of T-lever 140 causes equal but opposite tension in control lines 144 and 146 which are further connected to pitch control 134. Pitch control 134 may be any suitable mechanical or hydraulic conventional variable pitch control mechanism adapted to vary the pitch of rotor 48 in response to tension forces in control lines 144 and 146. T-lever 140 is neutralized by complimentary neutralizer springs 148 and 150, when T-lever 140 is not engaged by couples 122 and 124 in the same manner as springs 78 and 80 (FIG. 6a) neutralize T-lever 76.

Once in forward flight, vertical airfoil 24 (FIG. 1) is the primary means used to alter the line of flight and is actuated by lateral operation of control stick 28 (the pilot's left or right). Lateral motion of control stick 28 is translated into rotational motion of shaft 62 (FIGS. 6a, 2) by virtue of the coupling of stick 28 and shaft 62 at pin 96 and support and bearing assembly 151 which is secured to the helicopter 10 and may be any suitable bearing support which permits shaft 62 to rotate freely about its longitudinal axis (FIG. 7).

The details of the control assembly 152 are schematically illustrated in FIG. 7. Lateral displacement of stick 28 (in the direction of arrows 154) is translated into rotation of shaft 62 about its longitudinal axis as previously described. A lever arm 156 is securely mounted to shaft 62 via couple 158 so as to rotate with shaft 62 in the direction shawn by arrows 160.

A control line 162 loops around pulleys 164 mounted to helicopter 10 at the corners of a rectangular pattern. Lever arm 156 is connected at the mid-point of side 157 of the rectangular loop of control line 162, so that translation of arm 156 is the direction of arrows 160 creates tension forces in control line 162, causing line 162 to traverse around pulleys 164 as shown by arrows 166.

Shaft 56 is rotatably mounted concentrically within rotor drive shafts 45 and 47 in any conventional manner, such as by collar bushing and journal suspending shaft 56 from the upper end of rotor shaft 45 and a suitable bearing assembly mounted to helicopter 10 at the lower end of shaft 56. Provision of a suitable mounting will allow shaft 56 to rotate about its longitudinal axis (as shown by arrows 168) in response to lateral operation of control stick 28, thereby rotating vertical airfoil 24 mounted to the upper end of shaft 56 to steer helicopter 10.

Lever arm 170 is securely mounted to the lower end of shaft 56 on one end, and connected to control line 162 at the mid-point of the side 159 of the rectangular control line pattern. By virtue of this interconnection of control assembly 152, operation of stick 28 to the pilots left, for instance, rotates shaft 62 counterclockwise (as shown by arrow 172) which causes translation of arm 156 (in the direction of arrow 174) and a corresponding but opposite translation of lever 170 (in the direction of arrow 176); thereby causing shaft 156 to rotate (in the direction of arrow 178) to deflect airfoil 24 (in the direction of arrow 180 to the position indicated in phantom) thereby inducing aerodynamic forces on the right side of surface 24 which are transmitted through shaft 56 to roll helicopter 10 to the pilot's left. Lateral movement of control stick 28 to the pilot's right causes the helicopter to roll to the pilot's right in a similar but opposite manner.

The surface area of control surface 24 must be large enough to provide sufficient aerodynamic forces about the center of gravity of helicopter 10 to produce the desired rolling of helicopter 10. The force generated at the center of gravity of helicopter 10 will be dependent upon the surface area of control surface 24 as well as the length of moment arm from the center of gravity of helicopter 10 to the point of application of the force vector equivalent to the total aerodynamic force applied to airfoil 24.

The aerodynamic force on deflected airfoil 24 to one side or the other about the axis of shaft 56 is proportional to the air speed of helicopter 10, the surface area of airfoil 24, the angle of deflection 182, and the density of the air moving across the surface of airfoil 24 in accordance with known principles of aerodynamics. The force present on airfoil 24 is transmitted to helicopter 10 through shaft 56 causing helicopter 10 to roll or tilt about its center of gravity. The "tilting" or rolling force applied to helicopter 10 is therefore also directly proportional to the length of shaft 56 between the center of gravity of helicopter 10 and airfoil 24. The size of airfoil 24 as well as the length of shaft 56 necessary to provide optimal results will necessarily be different for each specific application (i.e. each different type of helicopter). As a general guideline, however, the length of shaft 56, and fuselage 12 should be approximately equal, so that airfoil 24 and rudder 50 are approximately equi-distant from the center of gravity of helicopter 10 which will in most applications be near the engine-transmission assembly 20 (FIG. 1).

Figure 2:
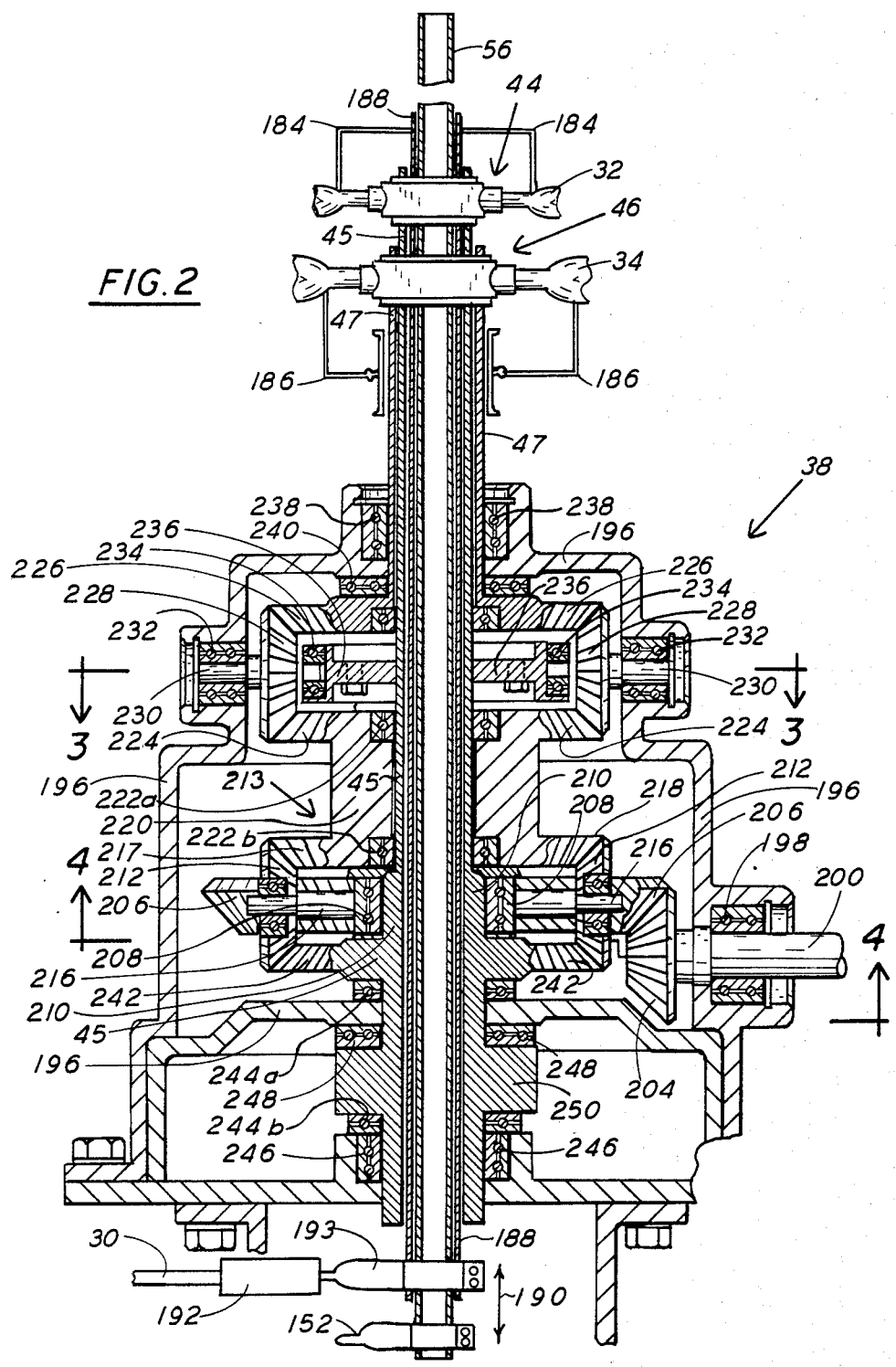
FIG. 2 is an elevational, partially cross-sectional view of a helicopter transmission made in accordance with the present invention.
Figure 3:
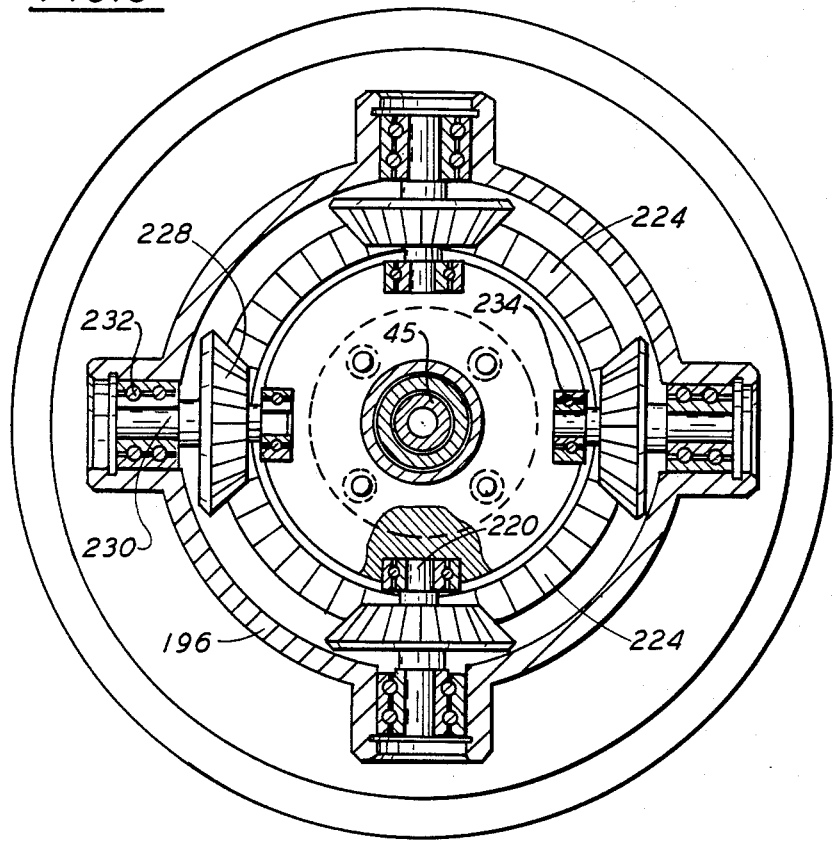
FIG. 3 is a planar, cross-sectional view of the transmission of FIG. 2 taken along line 3—3.

Vertical lift provided by rotors 32 and 34 (FIG. 1) may be varied by operation of collective pitch control 30 (FIG. 1) which may be coupled mechanically or with hydraulic assistance to conventional pitch control assemblies 184 and 186 which are illustrated schematically in FIG. 2. Such as coupling assembly 192 is illustrated schematically in FIG. 2 and may be any suitable mechanical, hydraulic assisted or other type of control coupling mechanism as are known in the art. In the preferred embodiment, collective pitch control 30 (FIG. 1) is mechanically coupled to a control shaft 188 (FIG. 2) so that operation of collective pitch control 30 by the pilot causes pitch control shaft 188 to translate vertically in the direction of arrows 190 (FIG. 2). However, any other suitable collective pitch control system as are known in the art may be used for this purpose.

Thus all direction of flight controls in the system of the present invention are operated using only rudder pedals 26, stick control 28 and collective pitch control 30 without the need for a cyclic pitch control as in conventional helicopter flight control systems. Indeed, in level flight, helicopter 10 equipped with a flight control system of the present invention is controlled in the same manner as fixed-wing aircraft — using only stick 28 and rudder pedals 26. Transmission 38, (FIGS. 1 and 2) which drives rotors 32 and 34, automatically maintains a balance in the reactive torque and a constant combined lift of rotors 32 and 34 providing smooth, level flight characteristics as will be described below.

DETAILED DESCRIPTION OF THE TRANSMISSION AND ROTOR DRIVE ASSEMBLY

Referring now to FIGS. 1–5 of the drawings, engine-transmission assembly 20 includes an engine 36 which provides power to drive rotor assembly 42 through transmission 38 and clutch 40. Engine 36 also drives shaft 39 to provide power to control assembly 22 as will be subsequently described. Engine 36 and clutch 40 may be any conventional engine and clutch assembly suitable for use in helicopters, such as conventional internal combustion or turbine-type engines and clutch assemblies which allow selective engagement and disengagement of engine 36 to transmission 38.

If counter-rotating rotors 32 and 34 always operated in identical aerodynamic environments (air density, air speed, drag etc.) each rotor would require equal effort to drive and develop an equal but opposite reactive torque which would balance that of the other rotor so that a zero net reactive torque would be applied to helicopter 10. Since the aerodynamic environment (the resistance to rotation) of each rotor 32 or 34 is different and changing when helicopter 10 is in flight and even while hovering since the turbulence produced by upper rotor 32 effects lower rotor 34, it is necessary to vary the individual speeds of rotation of rotors 32 and 34 to maintain a balance of the combined reactive torque produced by rotors 32 and 34. Transmission 38 (FIG. 2) drives rotors 32 and 34 and automatically varies the individual rotor speeds to maintain a balance in the reactive torque, generated by each rotor and coincidentally a constant combined lift of the rotor pair.

Transmission 38 includes a main casing 196 having a bearing assembly 198 at one side for rotatably supporting an input drive shaft 200 that is coupled to engine 36 through clutch 40 and flexible couple 202 (FIG. 1). A beveled drive gear 204 carried on input drive shaft 200 is in meshing engagement with a beveled ring gear 206 which is rotatably mounted to collar 210 of rotor shafts 45 by bearing assembly 208.

Figure 4:
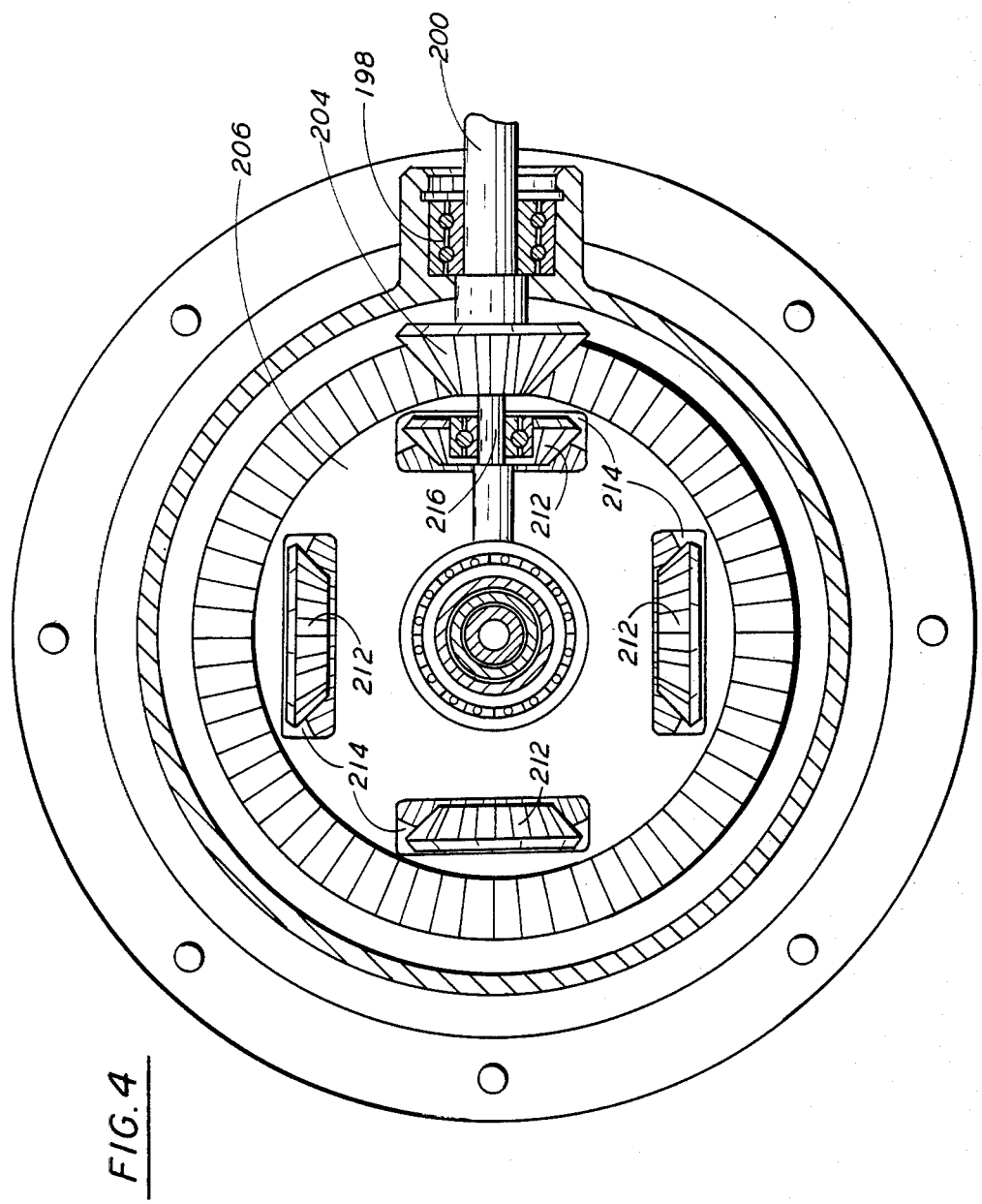
FIG. 4 is a planar, cross-sectional view of the transmission of FIG. 2 taken along line 4—4.

Referring now to FIG. 4, beveled ring gear 206 carries beveled gears 212 rotatably mounted within cutouts 214 in the inner portion of gear 206 on individual bearing supported shafts 216 (FIGS. 2, 4). Cutouts 214 are generally located radially equidistant from and at equal angular spacing about the center of gear 206. Gears 212 are in meshing engagement with the lower beveled sprocket 217 of reversing gear 218. Reversing gear 218 has a central hub 220 which is centered about and rotatably mounted to rotor shaft 45 on bearings 222. Reversing gear 218 also includes an upper beveled sprocket 224 which drivingly engages upper ring gear 226 (which is an integral extension of rotor shaft 47) through a plurality of intermediary beveled gears 228.

Intermediary gears 228 are rotatably mounted on individual shafts 230 supported on their outer end upon bearings 232 carried in main casing 196 and on their inner end upon bearings 234 carried in stationary hub 236. Beveled gear 226 is an integral extension of lower rotor shaft 47 which is rotatably centered with respect to casing 196 by bearing assembly 238. Beveled gear 226 acts against thrust bearings 240 which transmit the lift forces generated by lower rotor 34 to main casing 196 and ultimately to helicopter frame 16 (FIG. 2).

Beveled gears 212 are also in meshing engagement with lower ring gear 242 which is an integral extension of upper rotor shaft 45 and is supported by bearing assemblies 244a and 244b mounted to the lower portions of main casing 196. Lower ring gear 242 is rotatably centered relative to casing 196 and the other transmission components by bearing assembly 246. Vertical thrust bearing assembly 248 is mounted between an integral shaft flange 250 and main casing 196 and transfers vertical lift force from rotor shaft 45 to casing 196 and ultimately to helicopter frame 16.

In operation, reversing gear 218 and lower ring gear 242 provide differential gearing for rotor shafts 47 and 45, respectively. Gears 206 and 212 drive reversing gear 218, which, in association with gears 228 and 226, drives rotor shaft 47 in one direction, while gears 206, 212 and 242 drive rotor shaft 45 in the opposite direction.

Rather than driving gears 218 and 242 directly from beveled drive gear 204, ring gear 206 and the associated gearing form a power transfer assembly to allow the speed of rotation of rotor shafts 45 and 47 to vary depending upon the amount of rotational effort each rotor is experiencing at the time. Under ideal conditions rotor shafts 45 and 47 will be driven by transmission 38 at equal speeds in opposite directions, thus providing balanced opposite reactive torque forces and zero net rotational torque to helicopter 10. In actual operation, however, each of rotors 32 and 34 will experience a different rotational effort, and if driven at a constant speed would produce an imbalanced reactive rotational torque applied to helicopter 10, as well as abrupt variations in the total lift provided by rotors 32 and 34.

Since both rotor shafts 45 and 47 are driven indirectly from a single drive gear, the speed of rotation of individual shafts 45 and 47 may vary, but the total power transferred will remain constant. Thus, if rotor 32 experiences increased effort due to turbulence or other changing conditions causing the rotational speed of rotor 32 to decrease, the speed of rotation of rotor 34 will automatically be increased a proportionate and counterbalancing amount.

Transmission 38 thus automatically balances the reactive torque produced by rotors 32 and 34 and maintains the combined lift provided by rotors 32 and 34. These features not only provide a smooth flight but also provide a balance in combined rotor effort in a simple and efficient manner.

Refering now to FIGS. 5a, 5b a drive train assembly 252 for driving control rotors 48 and 52 is schematically illustrated. Mechanisms for driving rotors of type used as control rotors 48 and 52 are known any suitable conventional mechanism may be utilized for the purposes of the present invention. Assembly 252, schematically illustrated in FIGS. 5a, 5b is a conventional simple, direct drive mechanism which is suitable for the present invention.

Assembly 252 includes drive shaft 254 coupled to engine output shaft 39 via couple 256 and gear assemblies 258 and 260. Couple 256 may be any conventional mechanical couple such as a universal joint or the like as are customarily used to couple successive elements in rotating drive shaft assemblies.

Gear assembly 258 is contained within housing 259 and includes gears 262 and 264 in meshing engagement (FIG. 5b). Gear 262 is carried on and rotates with shaft 254, thereby driving gear 264 causing rotor shaft 266 and associated rotor 48 to rotate. Likewise, gear assembly 260 is contained within housing 261 and includes gears 268 and 170 in meshing engagement (FIG. 5a). Gear 268 is caried on and rotates with shaft 254, thereby driving gear 270 causing rotor shaft 272 and associated rotor 52 to rotate. Gear housing 259 and 260 are adapted to be large enough to contain conventional variable pitch controls 134 and 94, respectively (FIG. 6a) which have been omitted from FIGS. 5a, b for clarity.

Thus rotors 48 and 52 are driven by engine 36 through shaft 254 and associated gearing, and the amount of control force generated by either rotor 48 or 52 may be controlled by varying the pitch of rotor 48 or 52 in combination with varying the collective speed of rotation or rpm of shaft 254.

Flight control of a helicopter 10 built in accordance with the present invention is therefore simplified by eliminating the need for cyclic pitch control, and flight characteristics are improved by providing a rotor transmission for counter-rotating lift rotors which automatically balances the reactive torque applied by each rotor and the combined lift generated by the lift rotors.

The foregoing disclosure and description of the invention are illustrative and explanatory thereof, and various changes in the size, shape and materials, as well as in the details of the illustrated construction may be made without departing from the spirit of the invention.

I claim:

1. A flight attitude control system for helicopters having horizontally disposed lift rotors mounted above the helicopter fuselage, comprising:

a substantially vertically oriented airfoil, normally aligned parallel with the longitudinal axis of the helicopter and mounted to the helicopter above the lift rotor;

pilot actuable means with said airfoil for deflecting said airfoil from its position about its vertical axis thereby inducing aerodynamic force upon said airfoil to control the helicopter's direction of flight;

a horizontally oriented elevator, pivotally mounted to the helicopter and horizontally displaced from the center of gravity of the helicopter for controlling the pitch of the helicopter;

means with said elevator for selectively deflecting said elevator about the horizontal axis of said pivotal mounting;

a horizontally disposed, variable pitch rotor mounted to the helicopter and horizontally displaced from the center of gravity of the helicopter for controlling the pitch of the helicopter;

pilot actuable means with said horizontal rotor for selectively varying the pitch of said horizontal rotor;

pilot stick control means, associated with said pitch varying means and elevator deflecting means, for actuating said elevator deflector means and said horizontal rotor pitch varying means, wherein slight to moderate deflection of said stick means causes said elevator means only to be actuated, and full or extreme deflection of said stick means causes both said elevator deflecting means and said horizontal rotor pitch varying means to be actuated.

2. The system of claim 1, wherein said vertical airfoil is mounted substantially above the center of gravity of the helicopter.

3. The system of claim 1, wherein said vertical airfoil is mounted to a control shaft contained concentrically within a lift rotor shaft and extending vertically therefrom.

4. The system of claim 1, wherein said pilot actuable means for deflecting said airfoil includes a control stick having a 360° range of motion.

5. The system of claim 1, wherein said pilot actuable means includes a control stick having a 360° range of motion.

6. The system of claim 1, further including:

a vertically disposed, variable pitch rotor, mounted to the helicopter and horizontally displaced from the center of gravity of the helicopter for controlling the yaw of the helicopter; and pilot actuable means with said vertical rotor for selectively varying the pitch of said vertical rotor.

7. The system of claim 6, wherein said pilot actuable means for varying the pitch of said vertical rotor includes a pair of complementary, pilot actuable foot pedals.

8. The system of claim 1, further including:

a vertically oriented rudder, pivotally mounted to the helicopter and horizontally displaced from the center of gravity of the helicopter for controlling the yaw of the helicopter;

means with said rudder for selectively deflecting said rudder about the vertical axis of said pivotal mounting.

9. The system of claim 8, wherein said pilot actuable means includes a pair of complementary, pilot actuated foot pedals.

10. The system of claim 1, wherein the helicopter is equipped with an engine and a pair of counter-rotating lift rotors mounted on concentric individual rotor shafts, and further including:

power transmission means for drivingly connecting said lift rotors to the engine, and automatically maintaining a balance in the reactive torque imparted to the helicopter by said counter-rotating lift rotors.

11. A flight attitude control system for helicopters having horizontally disposed lift rotors mounted above the helicopter fuselage, comprising:

a substantially vertically oriented airfoil, normally aligned parallel with the longitudinal axis of the helicopter and mounted to the helicopter above the lift rotor;

pilot actuable means with said airfoil for deflecting said airfoil from its position about its vertical axis thereby inducing aerodynamic force upon said airfoil to control the helicopter's direction of flight;

a horizontally disposed, variable pitch rotor mounted to the helicopter and horizontally displaced from the center of gravity of the helicopter for controlling the pitch of the helicopter;

pilot actuable means with said horizontal rotor for selectively varying the pitch of said horizontal rotor;

a vertically disposed, variable pitch rotor, mounted to the helicopter and horizontally displaced from the center of gravity of the helicopter for controlling the yaw of the helicopter;

pilot actuable means with said vertical rotor for selectively varying the pitch of said vertical rotor;

a vertically oriented rudder, pivotally mounted to the helicopter and horizontally displaced from the center of gravity of the helicopter for controlling the yaw of the helicopter;

means with said rudder for selectively deflecting said rudder about the vertical axis of said pivotal mounting; and pilot pedal control means associated with said vertical rotor pitch varying means and with said vertical rudder deflection means, for actuating said rudder deflection means and said vertical rotor pitch varying means, wherein slight to moderate deflection of said pedal means causes said rudder deflection means to be actuated, and full to extreme deflection of said pedal means causes both said rudder deflection means and said vertical rotor pitch varying means to be actuated.

12. The system of claim 11, wherein the helicopter is equipped with an engine and a pair of counter-rotating lift rotors mounted on concentric individual rotor shafts, and further comprising:

power transmission means for drivingly connecting the lift rotors to the engine and automatically maintaining a balance in the reactive torque imparted to the helicopter by the lift rotors.

* * * * *

UNITED STATES PATENT AND TRADEMARK OFFICE
CERTIFICATE OF CORRECTION

PATENT NO. : 4,531,692
DATED : July 30, 1985
INVENTOR(S) : Ernesto Mateus

It is certified that error appears in the above-identified patent and that said Letters Patent are hereby corrected as shown below:

Column 1, line 32: Please delete "counter rotating" and insert therefor --counter-rotating--.

Column 2, line 42: Please delete "." and insert therefor --;--.

Column 2, line 45: Please delete ";" and insert therefor --.--.

Column 3, line 11: Please delete "theprovision" and insert therefor --the provision--.

Column 5, line 66: Please delete "shawn" and insert therefor --shown--.

Column 9, line 26: Please delete "170" and insert therefor --270--.

Column 9, line 27: Please delete "caried" and insert therefor --carried--.

Column 10, line 16: Please delete "elevator means" and insert therefor --elevator deflecting means--.

Signed and Sealed this

Twelfth Day of November 1985

[SEAL]

Attest:

DONALD J. QUIGG

Attesting Officer

Commissioner of Patents and Trademarks